United States Patent
Crewson et al.

(10) Patent No.: US 9,083,256 B2
(45) Date of Patent: Jul. 14, 2015

(54) CAPACITOR CHARGER SYSTEM, POWER MODULATOR AND RESONANT POWER CONVERTER

(71) Applicant: ScandiNova Systems AB, Uppsala (SE)

(72) Inventors: Walter Frederick John Crewson, Munsonville, NH (US); Klas Elmqvist, Uppsala (SE)

(73) Assignee: SCANDINOVA SYSTEMS AB, Uppsala (SE)

( * ) Notice: Subject to any disclaimer, the term of this patent is extended or adjusted under 35 U.S.C. 154(b) by 341 days.

(21) Appl. No.: 13/724,382

(22) Filed: Dec. 21, 2012

(65) Prior Publication Data

US 2014/0176086 A1    Jun. 26, 2014

(51) Int. Cl.
  *H02M 3/335*    (2006.01)
  *H02M 3/337*    (2006.01)
  *H02M 7/48*     (2007.01)

(52) U.S. Cl.
  CPC .... *H02M 3/3376* (2013.01); *H02M 2007/4815* (2013.01); *Y02B 70/1433* (2013.01); *Y02B 70/1441* (2013.01)

(58) Field of Classification Search
  CPC ............... H02M 3/33523; H02M 2007/4815; Y02B 70/1441; Y02B 70/1433
  See application file for complete search history.

(56) References Cited

U.S. PATENT DOCUMENTS

| | | | | |
|---|---|---|---|---|
| 6,839,245 | B2 * | 1/2005 | Yasumura | 363/21.02 |
| 6,952,355 | B2 * | 10/2005 | Riggio et al. | 363/21.15 |
| 7,285,875 | B2 * | 10/2007 | Yasumura | 307/127 |
| 7,388,760 | B2 * | 6/2008 | Yasumura | 363/17 |
| 8,023,290 | B2 | 9/2011 | Schlecht | |
| 8,723,428 | B2 * | 5/2014 | Yao | 315/177 |
| 8,817,507 | B2 * | 8/2014 | Liu et al. | 363/89 |
| 2006/0164776 | A1 | 7/2006 | Erdl | |
| 2010/0328968 | A1 * | 12/2010 | Adragna et al. | 363/21.02 |
| 2011/0080757 | A1 | 4/2011 | Young | |

* cited by examiner

*Primary Examiner* — Naum B Levin
(74) *Attorney, Agent, or Firm* — Nixon & Vanderhye P.C.

(57) ABSTRACT

A capacitor charger system has a resonant power converter to connect to a capacitor via a rectifier. The resonant power converter has a switch-based bridge network, an internal transformer, a resonant circuit, and an amplitude stabilization circuit. The switch-based bridge network comprises at least one pair of switches. The resonant circuit includes a series-resonant branch with capacitive and inductive components, and the resonant circuit is connected in the circuit path to a midpoint between a pair of switches of the switch-based bridge network. The amplitude stabilization circuit provides stabilization of the resonant amplitude of the resonant circuit, and the amplitude stabilization circuit includes one-way conducting circuitry connected between an unrestricted node defined by a junction and a connection point of the resonant power converter having a predefined voltage level at operation. The resonant power converter connects to the output rectifier via the secondary winding of the internal transformer.

20 Claims, 9 Drawing Sheets

FIG. 9

CAPACITOR CHARGER SYSTEM, POWER MODULATOR AND RESONANT POWER CONVERTER

TECHNICAL FIELD

The proposed technology relates to a capacitor charger system and a power modulator comprising such a capacitor charger system as well as a resonant power converter.

BACKGROUND

Capacitor charger systems are commonly used wherever short, high current pulses are utilized. Examples of applications include power modulators, accelerators, light flashes, x-ray systems and so forth.

A capacitor charger system normally includes a power supply such as a power converter for connection to the load capacitor via an output rectifier, where the capacitor is to be charged and discharged in cycles to assist in producing the final output pulses.

Power converters are generally used for converting electrical power from one form into another, or from one level to another, and normally constitute an integral part of any power supply. In particular, so-called resonant power converters are often used due to their advantages including low switching losses, and high operational switching frequencies.

However, resonant power converters have stability issues and in certain situations the current flowing in the resonant circuit of the power converter seems to increase without limitation. This may damage critical components in the power converter and affect the overall capacitor charger system.

RELATED ART

U.S. Pat. No. 8,023,290 relates to a power converter that delivers and recovers energy from capacitors associated with controlled rectifies in a secondary winding circuit, each controlled rectifier having a parallel uncontrolled rectifier. First and second primary switches in series with first and second primary windings, respectively are turned on for a fixed duty cycle, each for one half of the switching cycle.

US 2011/0080757 relates to a power converter and a method of operating a power converter that enables the operating frequency of the converter to be controlled by a control circuit over a predetermined range of the resonant frequency, to allow a reduction in acoustic noise generation and facilitate frequency smearing that will in turn reduce spectral peaks.

US 2006/0164776 relates to a current-limiting circuit that includes a switch, a diode, an inductance, an input with a first connection and a second connection, and an output with a first connection and a second connection. The first connection of the input is connected via the switch to the inductance and to the cathode of the diode and is connected via the inductance to the first connection of the output. The anode of the diode is connected to the second connection of the input and to the second connection of the output.

SUMMARY

The present invention overcomes these and other drawbacks of the prior art arrangements.

It is an object to provide an improved capacitor charger system that is based on a resonant power converter.

It is also an object to provide an improved power modulator.

Yet another object is to provide an improved resonant power converter.

These and other objects are met as defined by the accompanying patent claims.

The inventors have recognized that conventional resonant power converters are open to a run-away fault mode if the load is either short-circuited or open-circuited. In run-away mode, the voltage can increase cycle-by-cycle without limit and of course this increases the current flowing in the resonant branch circuit without limitations. This fault mode will eventually cause failure of one or more components in the converter such as the resonating capacitor, switches, the switch protective diodes across the switches, and so on.

In a first aspect, there is provided a capacitor charger system for a capacitor to be charged and discharged in cycles. The capacitor charger system comprises a resonant power converter for connection to the capacitor via an output rectifier. The resonant power converter comprises a switch-based bridge network, an internal transformer, a resonant circuit, and an amplitude stabilization circuit. The switch-based bridge network comprises at least one pair of controlled switches. The resonant circuit includes a series-resonant branch comprising at least one capacitive component and at least one inductive component, and the resonant circuit is connected in the circuit path to a midpoint between a pair of controlled switches of the switch-based bridge network. The capacitive component(s) of the resonant circuit is connected in a series path with a primary winding of the internal transformer. Furthermore, the amplitude stabilization circuit is configured to provide stabilization of the resonant amplitude of the resonant circuit, and the amplitude stabilization circuit includes one-way conducting circuitry connected between i) an unrestricted node defined by a junction anywhere in the circuit path from a capacitive component to an inductive component of the series-resonant branch and ii) at least one connection point of the resonant power converter having a predefined voltage level at operation so that the resonant amplitude of the resonant circuit is stabilized to vary within predefined limits. The resonant power converter is configured for connection to the output rectifier via the secondary winding of the internal transformer.

In this way, the run-away fault mode can be effectively controlled, thereby providing efficient protection of the components of the power converter such as switch(es), resonating capacitor(s) and so forth. Accordingly, the proposed technology ensures secure and reliable operation of the overall capacitor charger system.

In a second aspect, there is provided a power modulator comprising such a capacitor charger system.

In a third aspect, there is provided a resonant power converter. The resonant power converter comprises a switch-based bridge network, wherein the switch-based bridge network comprises at least one pair of controlled switches. The resonant power converter further comprises an internal transformer, and a resonant circuit. The resonant circuit includes a series-resonant branch comprising at least one capacitive component and at least one inductive component, and the resonant circuit is connected in the circuit path to a midpoint between a pair of controlled switches of the switch-based bridge network. The capacitive part of the resonant circuit is connected in a series path with a primary winding of the internal transformer. The resonant power converter also comprises an amplitude stabilization circuit. The amplitude stabilization circuit is configured to provide stabilization of the resonant amplitude of the resonant circuit, and the amplitude stabilization circuit includes one-way conducting circuitry connected between i) an unrestricted node defined by a junction anywhere in the circuit path from a capacitive component to an inductive component of the series-resonant branch and ii) at least one connection point of the resonant power converter having a predefined voltage level at operation, to thereby stabilize the resonant amplitude to vary within predefined limits.

The proposed technology is applicable to both full-bridge and half-bridge designs as well as power converters of different modulation types.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Throughout the drawings, the same reference characters will be used for corresponding or similar elements.

Figure 1:
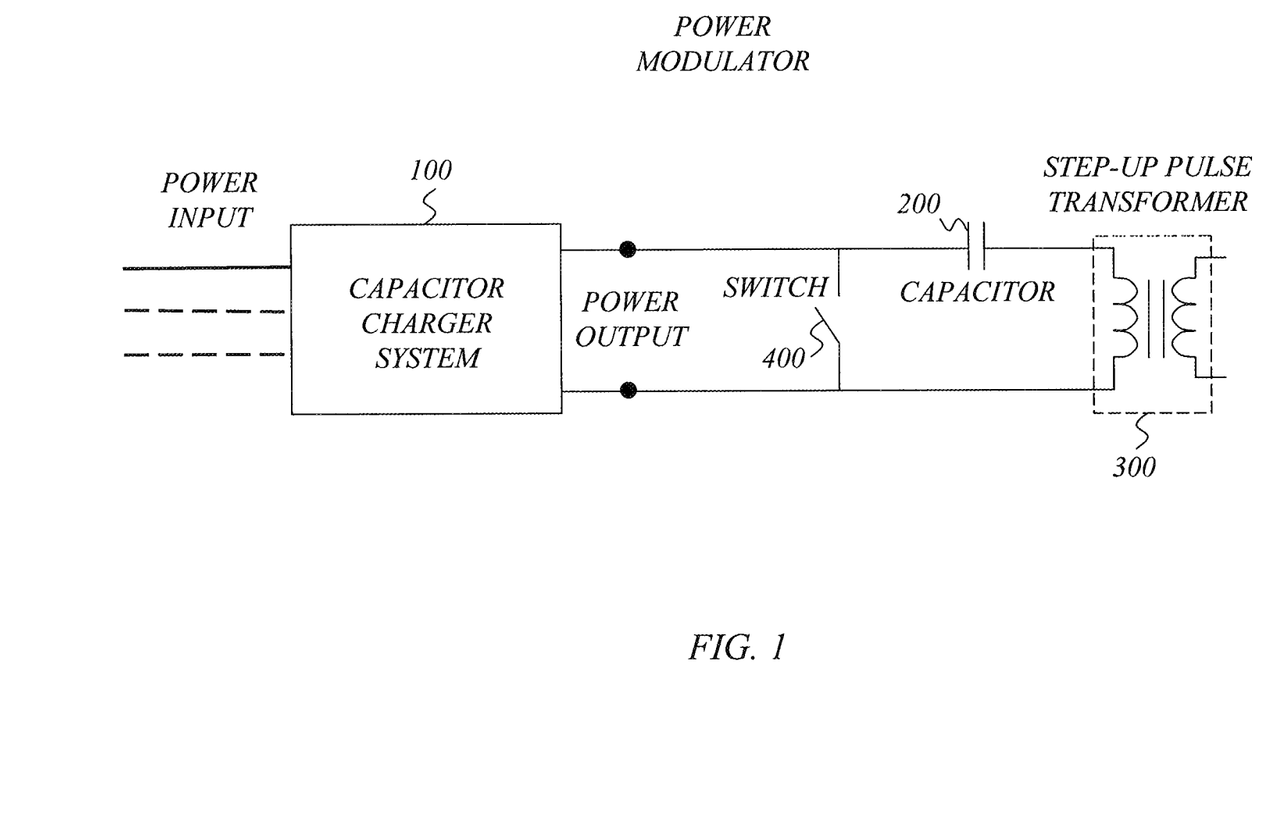
FIG. 1 is a schematic diagram illustrating an example of an application involving a capacitor charger system.

FIG. 1 is a schematic diagram illustrating an example of an application involving a capacitor charger system. The overall application illustrated in FIG. 1 basically corresponds to a power modulator, and shows the capacitor charger system 100 and how it is connected to a capacitor 200 and further on to an optional step-up pulse transformer 300. The output of the capacitor 200 is going through the primary winding of the step-up transformer 300. The switch 400 that is discharging the capacitor 200 is basically short-circuiting the capacitor charging system output. The capacitor 200 is typically charged and discharged in cycles, and the switch 400 is electronically controllable at both turn-on and turn-off to control the duration of the output pulses. The capacitor 200 is normally partially discharged, and the capacitor charger system is then called upon to recharge the capacitor to its original voltage, before the next cycle begins.

Of course, other applications exist as already mentioned in the background section.

As mentioned in the background, a capacitor charger system normally includes a power supply such as a power converter. In particular, so-called resonant power converters are often used due to their advantages including low switching losses, and high operational switching frequencies.

However, the inventors have recognized that all resonant-mode power converters are open to a run-away fault mode if the load is either short-circuited or open-circuited. In run-away mode, the voltage can increase cycle-by-cycle without limit and of course this increases the current flowing in the resonant branch circuit without limitations. This fault mode will eventually cause failure of one or more components in the converter such as the resonating capacitor, switches, the switch protective diodes across the switches, and so on.

According to the proposed technology invention, this run-away mode can be effectively controlled by providing a balanced and stabilized circuit design based on properly configured amplitude stabilization of the resonant amplitude of the resonant-mode power converter.

In general, the capacitor charger system comprises a resonant power converter for connection to the capacitor via an output rectifier. The resonant power converter comprises a switch-based bridge network, an internal transformer, a resonant circuit, and an amplitude stabilization circuit. The switch-based bridge network comprises at least one pair of controlled switches. The resonant circuit includes a series-resonant branch comprising at least one capacitive component and at least one inductive component, and the resonant circuit is connected in the circuit path to a midpoint between a pair of controlled switches of the switch-based bridge network. The capacitive component(s) of the resonant circuit is connected in a series path with a primary winding of the internal transformer. Furthermore, the amplitude stabilization circuit is configured to provide stabilization of the resonant amplitude of the resonant circuit, and the amplitude stabilization circuit includes one-way conducting circuitry connected between i) an unrestricted node defined by a junction anywhere in the circuit path from a capacitive component to an inductive component of the series-resonant branch and ii) at least one connection point of the resonant power converter having a predefined voltage level at operation so that the resonant amplitude of the resonant circuit is stabilized to vary within predefined limits. The resonant power converter is configured for connection to the output rectifier via the secondary winding of the internal transformer.

With this circuit design, the run-away fault mode can be effectively controlled, thereby providing efficient protection of the components of the power converter. Accordingly, the proposed technology ensures secure and reliable operation of both the resonant power converter and the overall capacitor charger system.

In the following, the basic idea will be expressed in ways which recognize its generality yet relate to specific examples. Examples of a circuit design are illustrated in the schematic circuit diagrams of FIGS. 2-9.

Figure 2:
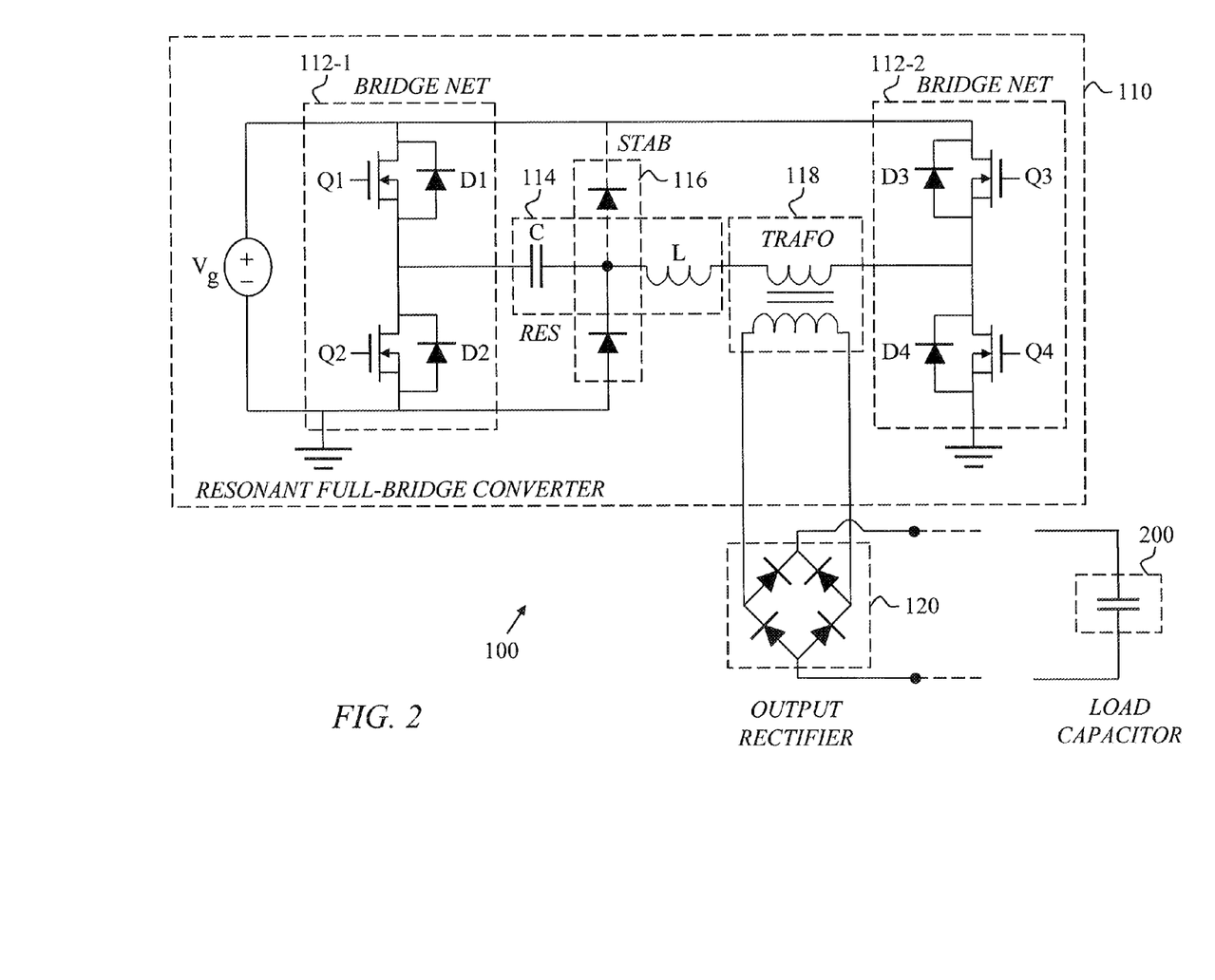
FIG. 2 is a schematic circuit diagram illustrating an example of capacitor charger system according to a first embodiment.

FIG. 2 is a schematic circuit diagram illustrating an example of capacitor charger system according to a first embodiment. In this example, the overall capacitor charger system 100 is based on a resonant full-bridge converter 110. The resonant power converter 110 is arranged for connection to the load capacitor 200 via an output rectifier 120.

In the example of FIG. 2, the resonant power converter 110 comprises a symmetric switch-based bridge network 112-1, 112-2, an internal transformer 118, a resonant circuit 114, and an amplitude stabilization circuit 116. The symmetric switch-based bridge network 112-1, 112-2 comprises two pairs of controlled switches Q1-Q2, Q3-Q4.

The resonant circuit 114 includes a series-resonant branch comprising at least one capacitive component C and at least one inductive component L, and the resonant circuit 114 is connected in the circuit path to a midpoint between a pair of controlled switches Q1-Q2 of the switch-based bridge network. In the example of a symmetric bridge network, the resonant circuit 114 is connected in the circuit path from the midpoint between the first pair of controlled switches Q1-Q2 and the midpoint between the second pair of controlled switches Q3-Q4.

The capacitive component(s) C of the resonant circuit 114 is connected in a series path with a primary winding of the internal transformer 118. The series path may of course also include any inductive component(s) of the resonant circuit 114. Alternatively, the inductive part of the resonant circuit 114 is integrated with the primary winding of the internal transformer 118, as will be described later on. Furthermore, the amplitude stabilization circuit 116 is configured to provide stabilization of the resonant amplitude of the resonant circuit 114, and the amplitude stabilization circuit includes one-way conducting circuitry connected between i) an unrestricted node defined by a junction anywhere in the circuit path from a capacitive component C to an inductive component L of the series-resonant branch and ii) at least one connection point of the resonant power converter 110 having a predefined voltage level at operation so that the resonant amplitude of the resonant circuit 114 is stabilized to vary within predefined limits.

The predefined voltage level is preferably a fixed and stable voltage level. For example, the first connection point may have a positive voltage level and the second connection point may have a negative voltage level.

The one-way conducting circuitry between the so-called unrestricted node and the connection point(s) having a predefined voltage level is preferably realized by passive one-way conducting circuitry.

By way of example, the amplitude stabilization circuitry includes at least one diode, or equivalent circuitry conducting in one direction only, connected from the unrestricted node of the resonant circuit 114 of the power converter 110 to a respective connection point such as a power rail, or circuit rail, having a predefined voltage to thereby stabilize the resonant amplitude of the power converter.

Since the considered type of power converter 110 is based on a resonant circuit 114, it will normally be sufficient to connect a single diode from the unrestricted node to a connection point having a predefined voltage level at operation. In a particular example, the diode is connected from the unrestricted node as defined by said junction to a DC power rail of the power converter 110.

Alternatively, a first diode is connected from the unrestricted node to a first connection point having a first predefined voltage level at operation, and a second diode is connected from the unrestricted node to a second connection point having a second predefined voltage level at operation. Such a configuration of the amplitude stabilization circuitry 116 may have a symmetrical structure with respect to the unrestricted node. In the following, a symmetric design of the stabilization circuit 116 having two diodes will mainly be discussed.

As an example, each diode may be connected from the unrestricted node to a respective connection point being represented by a respective one of the DC power rails of the power converter 110. Application of this idea typically means that the converter design be adjusted so the voltage at the "unrestricted node" does not exceed the positive DC bus or rail in normal operation, or go below the negative DC bus or rail in normal operation. For most converter systems, this is not a harmful restriction as the design is based on this level of voltage swing in any case. If the power converter 110 is designed to allow a larger voltage swing, then it may be necessary to construct two DC voltages larger in magnitude than the positive and negative DC input voltages to serve as connection points for the diodes.

Normally, the DC rail voltage Vg is derived from a three-phase power line rectifier, so the positive and negative rails of the converter are above and below ground in the usual case. however, it may be possible to connect the 'low' DC rail to ground. The low voltage side can be grounded if the power line 'floats' free from ground, e.g. if derived from a dedicated power trafo, and then the protective limiting diode does connect to ground.

In the particular example of FIG. 2, the resonant circuit 114 includes a series-resonant branch composed of a series-connection of a capacitor C and an inductor L. When the resonant circuit 114 of the power converter 110 is based on a resonating inductor-capacitor (LC) circuit, the unrestricted node is normally defined by the junction between the capacitor and the inductor, the so-called LC-junction of the series-resonant branch.

The resonant power converter 110 is configured for connection to the output rectifier 120 via the secondary winding of the internal transformer 118.

When the load capacitor 200 is at least partially discharged, the capacitor charger system 100 is called on to recharge the capacitor, and then the amplitude stabilization circuit is configured to step in at the beginning of the recharge process to prevent a run-away condition.

Figure 3:
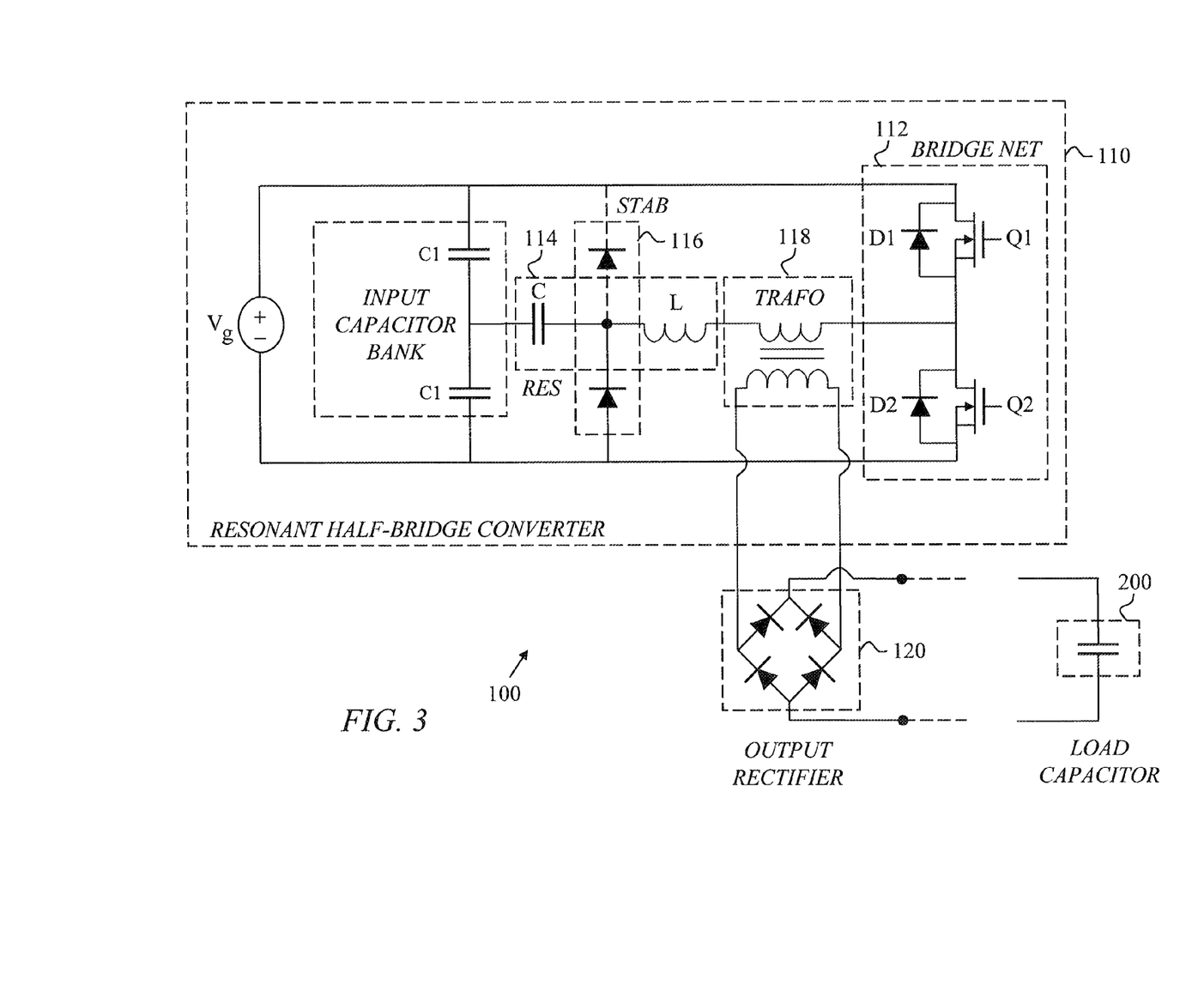
FIG. 3 is a schematic circuit diagram illustrating an example of capacitor charger system according to a second embodiment.

FIG. 3 is a schematic circuit diagram illustrating an example of capacitor charger system according to a second embodiment. In this example, the overall capacitor charger system 100 is based on a resonant half-bridge converter 110. The resonant power converter 110 is arranged for connection to the load capacitor 200 via an output rectifier 120.

In the example of FIG. 3, the resonant power converter 110 comprises a switch-based half bridge network 112, an internal transformer 118, a resonant circuit 114, and an amplitude stabilization circuit 116. The switch-based half bridge network 112 comprises a pair of controlled switches Q1-Q2.

The resonant circuit 114 includes a series-resonant branch comprising at least one capacitive component C and at least one inductive component L, and the resonant circuit 114 is connected in the circuit path to the midpoint between the pair of controlled switches Q1-Q2 of the switch-based half bridge network 112.

In the particular example of FIG. 3, the resonant circuit 114 is connected in the circuit path from the midpoint between a pair of capacitors C1-C1 of an input capacitor bank and the midpoint between the pair of controlled switches Q1-Q2.

The capacitive component(s) C of the resonant circuit 114 is connected in a series path with a primary winding of the internal transformer 118. The series path may of course also include any inductive component(s) of the resonant circuit 114. Alternatively, the inductive part of the resonant circuit 114 is integrated with the primary winding of the internal transformer 118, as will be described later on.

Furthermore, the amplitude stabilization circuit 116 is configured to provide stabilization of the resonant amplitude of the resonant circuit 114, and the amplitude stabilization circuit includes one-way conducting circuitry connected between i) an unrestricted node defined by a junction anywhere in the circuit path from a capacitive component C to an inductive component L of the series-resonant branch and ii) at least one connection point of the resonant power converter 110 having a predefined voltage level at operation so that the resonant amplitude of the resonant circuit 114 is stabilized to vary within predefined limits.

The predefined voltage level is preferably a fixed and stable voltage level. For example, the first connection point may have a positive voltage level and the second connection point may have a negative voltage level.

By way of example, the amplitude stabilization circuitry includes at least one diode, or equivalent circuitry conducting in one direction only, connected from the unrestricted node of the resonant circuit 114 of the power converter 110 to a respective connection point such as a power rail, or circuit rail, having a predefined voltage to thereby stabilize the resonant amplitude of the power converter. The amplitude stabilization circuitry 116 may include a single diode from the unrestricted node to a connection point such as a DC power rail having a predefined voltage level at operation, or a first diode connected from the unrestricted node to a first connection point having a first predefined voltage level at operation, and a second diode connected from the unrestricted node to a second connection point having a second predefined voltage level at operation.

When the resonant circuit 114 of the power converter 110 is based on a series-connection of a capacitor C and an inductor L, the unrestricted node is normally defined by the junction between the capacitor and the inductor, the so-called LC-junction of the series-resonant branch.

The resonant power converter 110 is configured for connection to the output rectifier 120 via the secondary winding of the internal transformer 118.

As previously mentioned, the inductive part of the resonant circuit 114 may be integrated with the primary winding of the internal transformer. The inductance L of the primary winding is adapted accordingly to obtain the desired properties of the resonant circuit.

Figure 4:
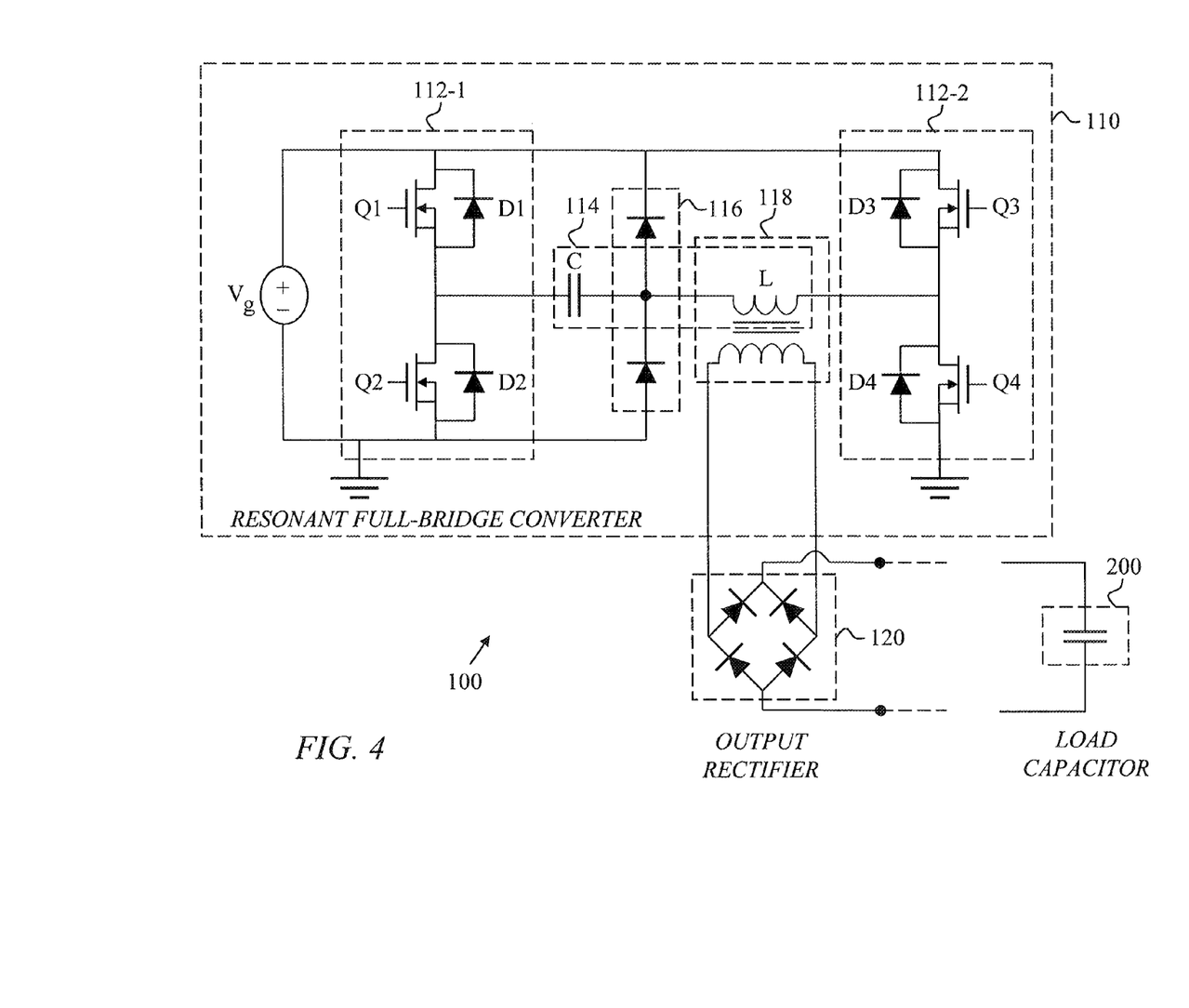
FIG. 4 is a schematic circuit diagram illustrating an example of capacitor charger system according to a third embodiment.
Figure 5:
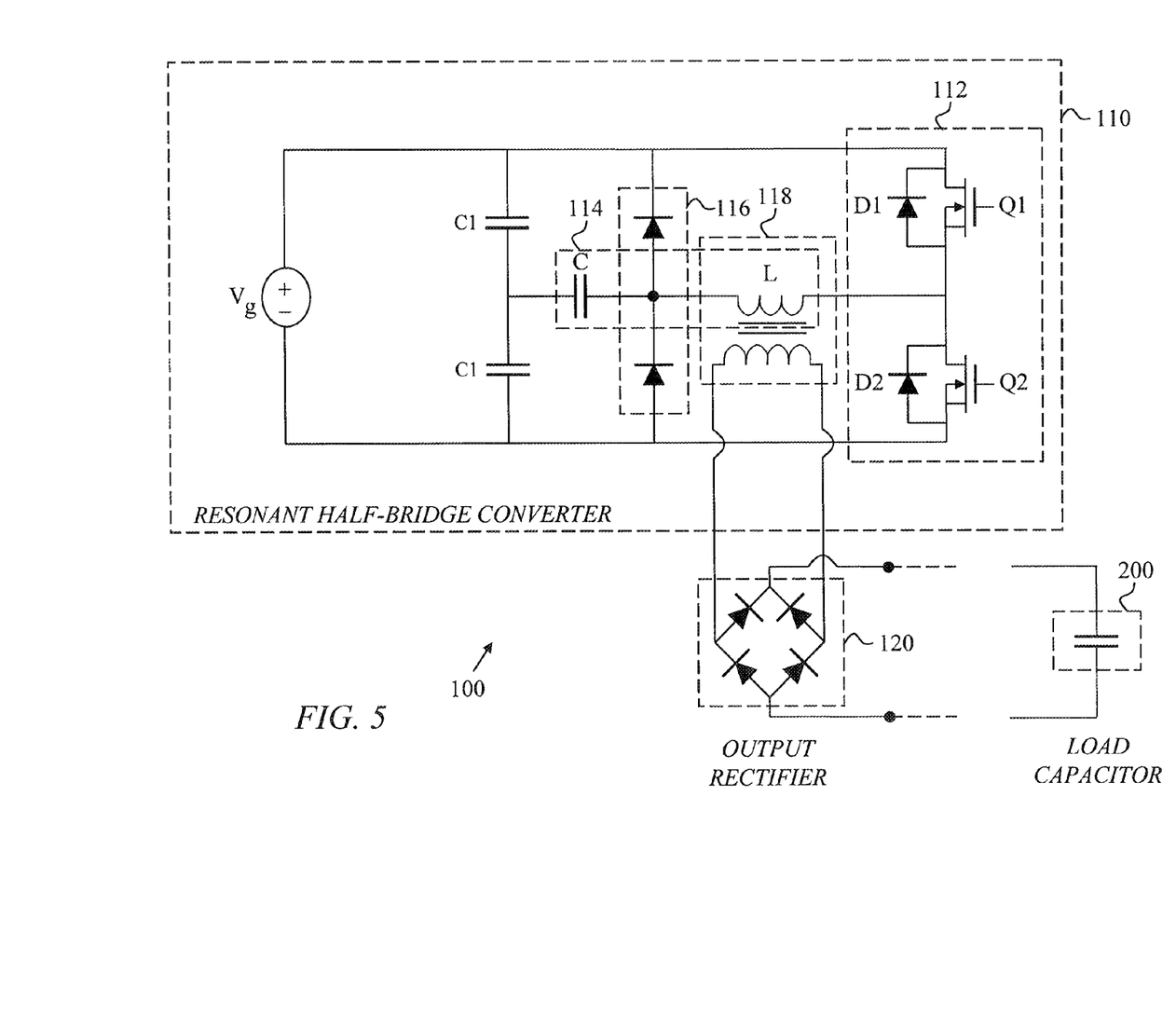
FIG. 5 is a schematic circuit diagram illustrating an example of capacitor charger system according to a fourth embodiment.
Figure 6:
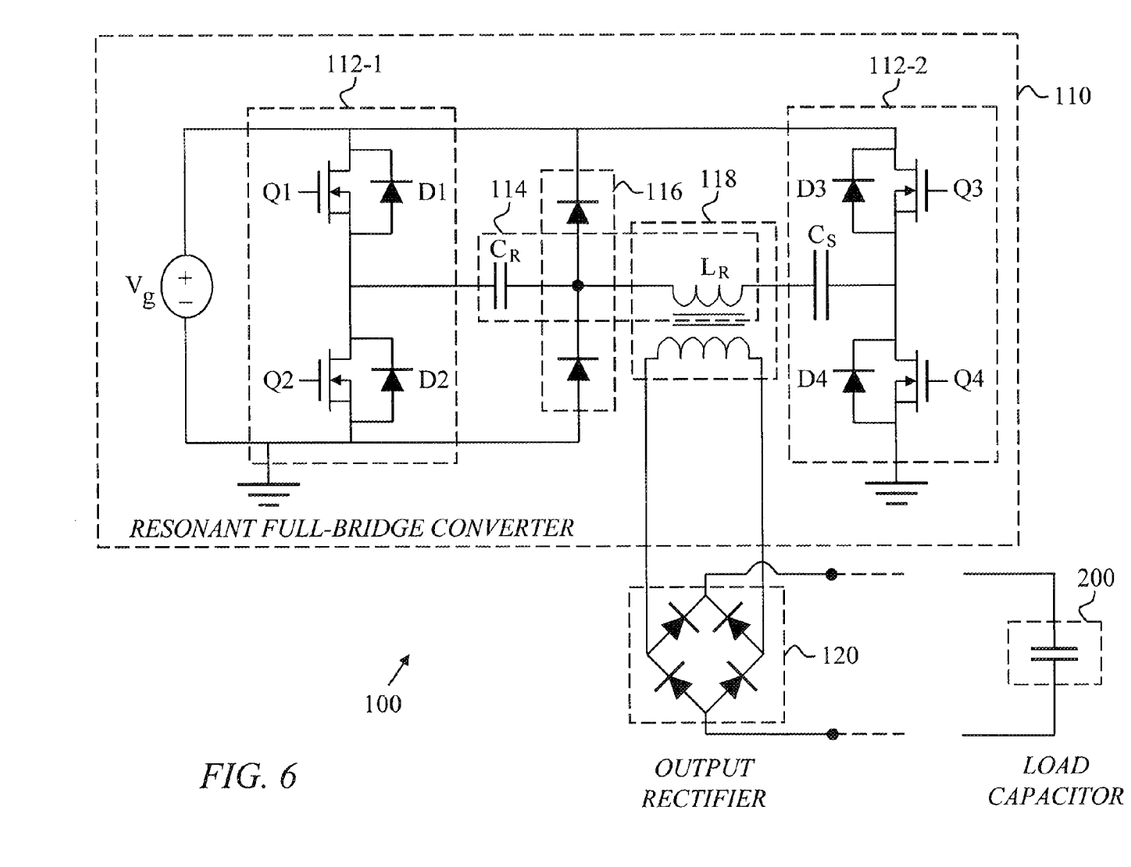
FIG. 6 is a schematic circuit diagram illustrating an example of capacitor charger system according to a fifth embodiment.
Figure 7:
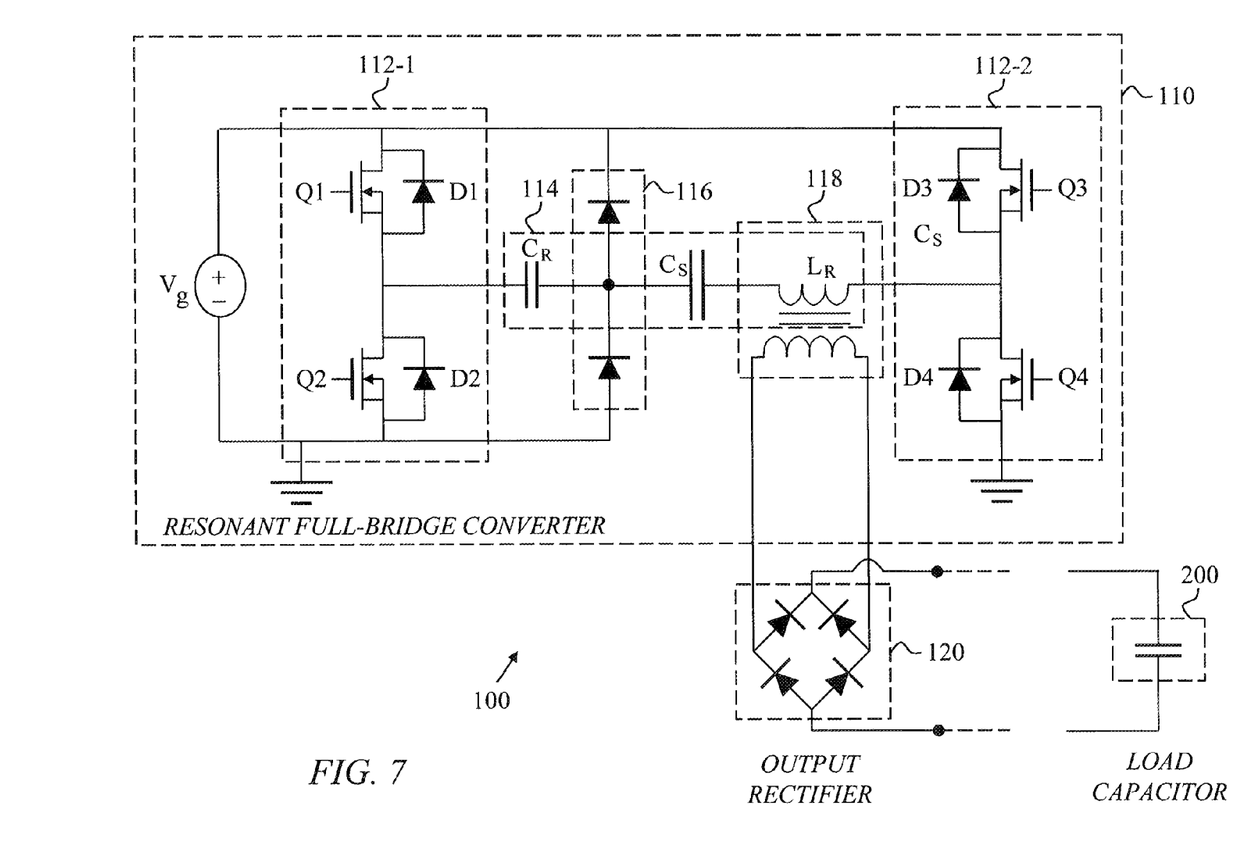
FIG. 7 is a schematic circuit diagram illustrating an example of capacitor charger system according to a sixth embodiment.
Figure 8:
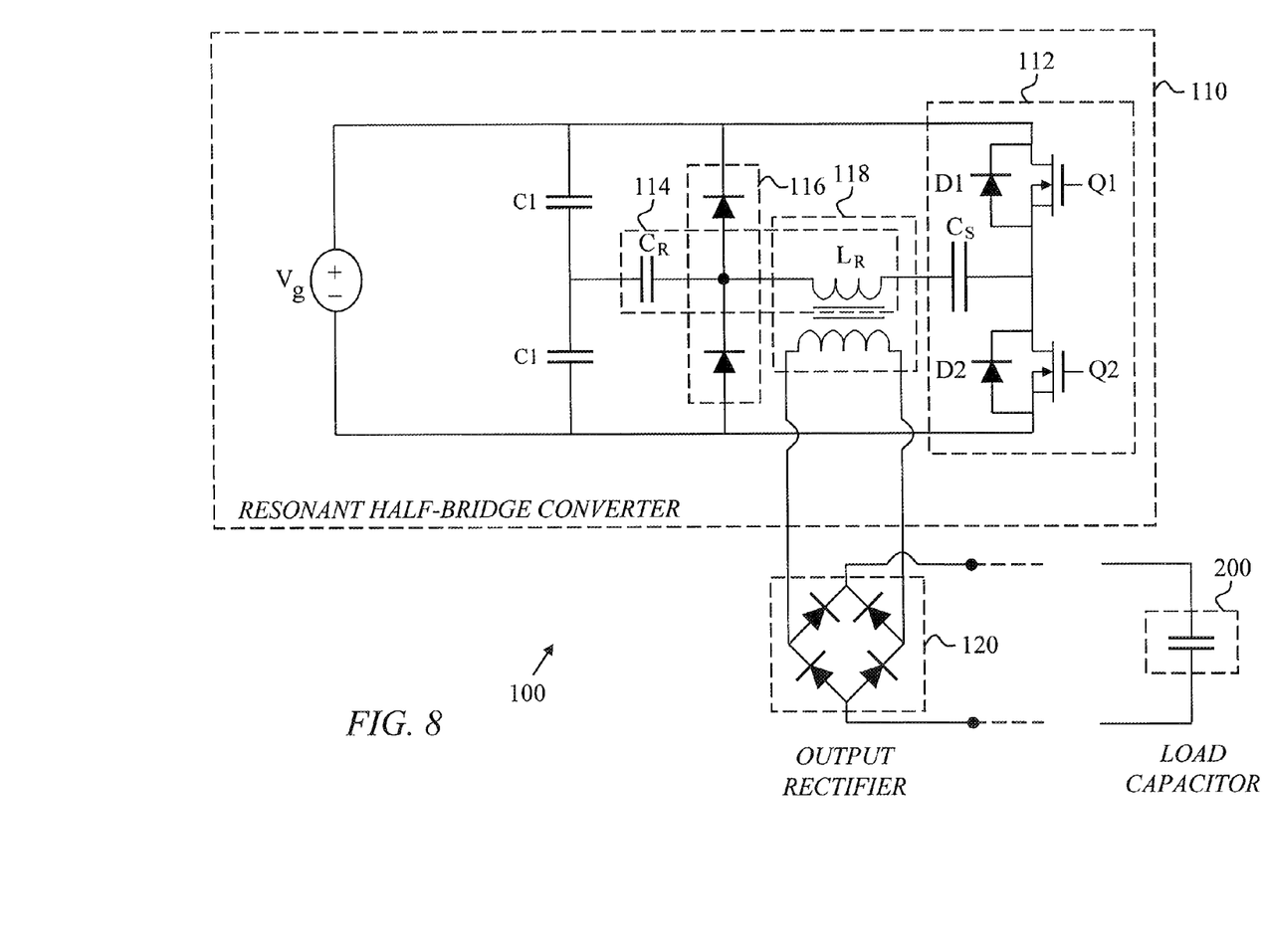
FIG. 8 is a schematic circuit diagram illustrating an example of capacitor charger system according to a seventh embodiment.
Figure 9:
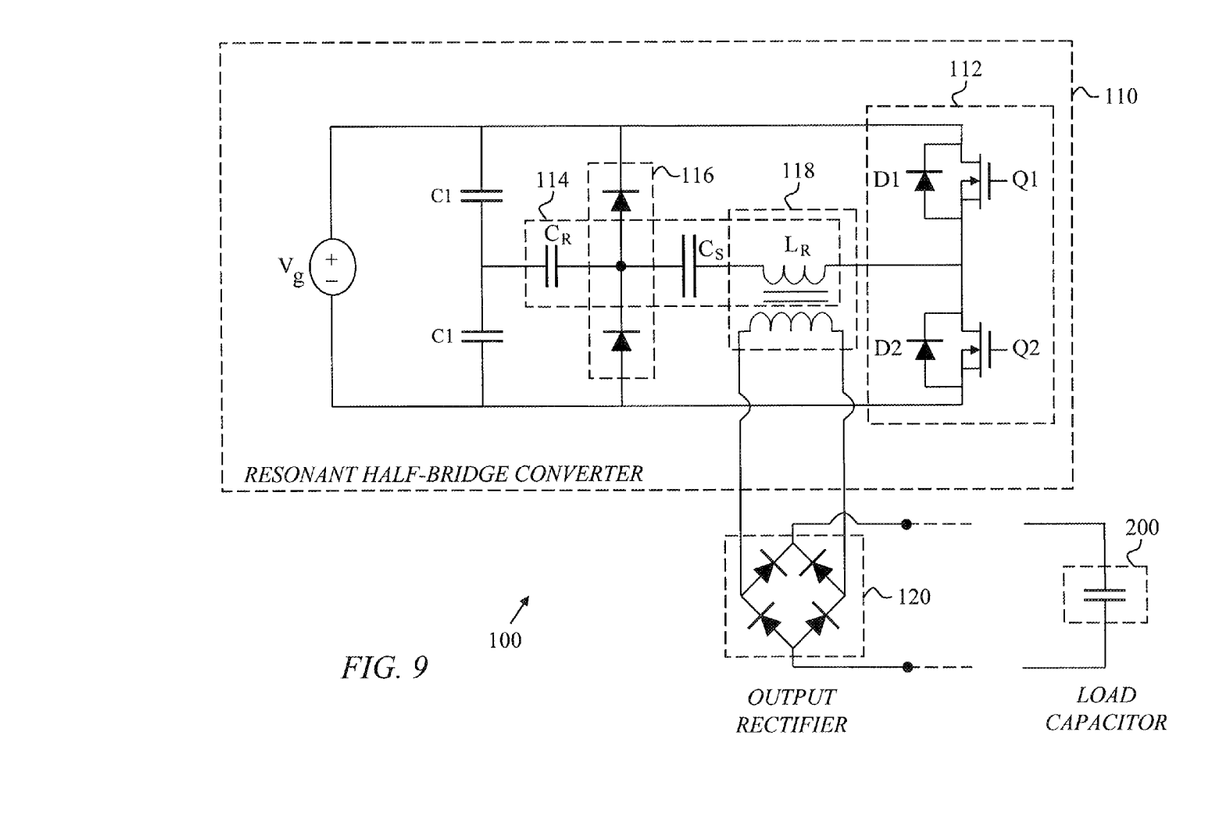
FIG. 9 is a schematic circuit diagram illustrating an example of capacitor charger system according to an eighth embodiment.

This is illustrated for a full-bridge converter in FIGS. 4, 6 and 7, and for a half-bridge converter in FIGS. 5, 8 and 9. In particular, FIG. 4 is similar to FIG. 2, except for the integration of the inductive part of the resonant circuit with the primary winding of the internal transformer. FIG. 5 is similar to FIG. 3, except for the integration of the inductive part of the resonant circuit with the primary winding of the internal transformer.

For a better understanding, it may be useful to review the run-away mode of a resonant power converter. As mentioned, there is a possibility of "run-away" circuit operation, with damage to resonant circuit components, switches, diodes, and other parts of the resonant power converter. This can occur when the operating frequency of the switching components matches the resonant frequency of any of the resonant circuits (or when this switching frequency is any integral sub-harmonic of the resonant frequency) and the dissipative part of the circuit (the load) is short-circuited or open-circuited. This removes the energy loss function from the circuit, and permits an unlimited resonant voltage and current build-up in the resonant circuits.

A passive procedure that limits the build-up of these large oscillations is to connect one or more diodes to the resonant capacitor(s) in such a manner that when the voltage on the capacitor(s) exceeds a fixed level, the one or more diodes conduct and clamp the capacitor voltage to the fixed level. This prevents damage to the circuit components.

An additional advantage accrues if the protective diodes are connected to the DC rails that supply the power converter circuit with input power. In this case, the excess current that builds up in the resonant circuits is fed back to the main source $V_g$ of DC power, providing a "lossless" protection function.

The input power is thereby reduced by conduction of the stabilizing or protecting diodes. This method does not interfere with normal operation of the power conversion circuits, as in normal operation the resonant capacitor voltage does not exceed the fixed protection voltage. However, at any time that the load is removed either by a short circuit or an open circuit, the protection method operates automatically to preserve the integrity of the power conversion system and prevent damage to its components.

Yet another advantage springs from the realization that it is now possible to use an operating frequency of the switching components that more closely matches the resonant frequency of the power converter, thus increasing the overall efficiency of the power converter. The power converter may for example be configured to operate based on a switching frequency, e.g. PWM frequency, that lies within 5-10% of the resonant frequency, or even within 3% or ultimately down to within about 1% of the resonant frequency. However, the switching frequency is preferably not closer to the resonant than a given safety margin to avoid any overlap between the cycles of the power converter.

The diodes used in the amplitude stabilization circuit generally function to limit the voltage excursion of the resonant capacitor C at the unrestricted node. Without the diodes, this voltage is not limited and can exceed the voltage on the DC Bus or exceed (negatively) the voltage on the negative side of the DC Bus. With the diodes, the voltage at the unrestricted node cannot exceed that of the positive side of the DC bus or be less than that of the negative voltage of the DC bus. So the total voltage change of the resonant capacitor is limited to a maximum value of $V_{DC}$, where $V_{DC}$ is the DC bus voltage between the positive side and the negative side (or the voltage from ground to the DC bus operating voltage).

Note that the description in the following section applies strictly to the case where the load voltage is zero, either because of a short-circuit at the load or the load capacitor is not charged, which occurs at the start of a new operating period for the modulator. This means there is no "reflected" voltage from the load that influences the current in the resonant circuit. So the following comments assume zero reflected load voltage, a short-circuit condition at the load.

The charge transferred in and out of the resonating capacitor(s) cycles back and forth twice per cycle of the switching frequency of the switches. When the upper switch turns on, the voltage at the unrestricted node is driven upward toward the positive DC bus voltage. If this voltage "overshoots" that of the positive DC bus voltage, the diode conducts and clamps the unrestricted node to positive DC bus voltage, stopping the voltage change. When the upper switch turns off, the current flowing through the resonating capacitor falls to zero, and the voltage change at the unrestricted node stops. This leaves the voltage at the unrestricted node stationary at that of the positive DC bus voltage. Now the lower switch turns on, pulling the voltage at the unrestricted node downward toward the negative DC bus voltage. This voltage swings downward and is stopped when it reaches the negative DC bus voltage, where a diode turns on and clamps it. So during each cycle, defined as one operation of the upper switch and one operation of the lower switch, the voltage at the unrestricted node changes from $V_a$ to $V_b$ and back again to $V_a$. Since charge is the time integral of current, and the voltage of a capacitor is given by V=Q/C, we see that to make a change of 2Va (voltage on $C_{resonant}$ swings from $V_a$ to $V_b$, which equals minus $V_a$), the charge flowing through the resonant capacitor must equal $Q=2CV_a$.

This happens twice per cycle, so in a cycle period T, the net charge flowing is $Q=4CV_a$. So the average current in one cycle is $I=Q/T=4CV_a/T$.

The charge flowing through the resonant capacitor also flows through the "load" capacitor (of course the transformer turns ratio comes into the act here, and the secondary charge is the primary charge divided by the voltage step-up ratio of this transformer). The rectifier bridge "steers" the current flow so it always flows toward the right into the upper terminal of the load capacitor, regardless of the direction of current in the resonating capacitor. So each cycle of the inverter sends two pulses of positive current into the load capacitor, and this current is equal to the primary current divided by the voltage step-up ratio of the transformer:

$$I_{sec}=4CV_a/NT \text{ where } N=V_{secondary}/V_{primary}$$

A careful analysis concludes that if the amplitude stabilization circuit with its diode(s) is not installed, there is nothing to limit the voltage swing (excursion) on the resonant capacitor and thus there is nothing to limit the current that the power supply can deliver. The voltage on the resonant capacitor increases (it actually doubles) with each cycle of the power supply, so not many cycles are needed before this voltage (and the related output current) are many times larger than the ratings of the switches and output rectifier diodes, and failures occur in these components. But if the amplitude stabilization circuit is installed in the way illustrated in the circuit diagrams, the maximum current that the power supply can deliver is limited to the secondary current given above.

Many of the prior art circuits used in the past attempt to limit the short-circuit output current of the power supply. These include current detectors which exert a feed-back effect that shortens the pulse width ("on" time) of the switches. But even with a very short pulse width, the above over-current effect will develop. It takes longer, but it still happens. The only way to be sure of safety is to turn off the switches completely, wait for a period of time, then slowly begin to turn them back "on" again. This is known in the literature as "fold-back" current limiting, and up to now has been the best known method of avoiding power supply damage with a shorted load. This method depends on active circuits, however (amplifiers, comparators, etc.) and can be rendered ineffective by a failure in these components.

The proposed technology on the other hand is preferably based on "passive" amplitude stabilization circuitry and does not require any feedback systems or other active protection circuits. It is just "there" all the time, standing guard. During normal operation of the power supply, the diodes do not conduct and the stabilization circuitry is "invisible". But when it is needed, the protection is immediate.

In some cases of mismatched pulse widths, the DC path that exists through the transformer primary due to the stabilization diodes can cause a DC current build-up that will eventually saturate the transformer. This in turn will break the coupling from primary to secondary and this effectively removes the load from the inverter. This can be solved, for example by arranging a further capacitor $C_S$ in series with the transformer primary to prevent the saturation of the transformer, as illustrated in the examples of FIGS. 6-9. This additional capacitor, when properly configured, breaks the DC path and prevents saturation current build-up. For example, a capacitance that is four or five times larger in value (the capacitor can be lower in voltage rating by the same factor of four or five) than the resonating capacitance can be used. This will raise the resonant frequency slightly, but that can be corrected by adjusting the configuration of the resonant circuit.

It should be understood that although the additional saturation-preventing capacitor $C_S$ may be arranged in the 'middle' of the series-resonant branch of the resonant circuit 114, as illustrated in the circuit diagrams of FIG. 7 and FIG. 9, the unrestricted node may still be defined as a junction in the circuit path from a capacitive component $C_R$ to an inductive component $L_R$ of the series-resonant branch.

In a preferred application, the power converter is used as a DC power supply in a power modulator. The overall power modulator is then generally configured for producing high power pulses. For example, the power supply may be operated as a capacitor charger system in the power modulator. When running such a pulsed power system, the power supply may be charging the capacitive load up to a specified voltage level. A trigger defines when the capacitor will be discharged to thereby produce a useful pulse that can be transferred to the load. Once the capacitor is discharged, a new charging cycle begins. When the capacitor is recharged it can once again be discharged to produce the next pulse.

The power supply can typically supply more than 10 kW mean power. For example, the capacitor charger system and the associated capacitor load may be combined with a step-up pulse transformer, e.g. for driving a microwave amplifier tube. It is also possible to use multiple capacitor modules to drive the primary windings of the transformer. The capacitor voltage of each capacitor module is typically higher than 500 V but lower than 2500 V, and preferably between 900 and 1500 V.

The embodiments described above are merely given as examples, and it should be understood that the present invention is not limited thereto. Further modifications, changes and improvements which retain the basic underlying principles disclosed and claimed herein are within the scope of the invention.

The invention claimed is:

1. A capacitor charger system for a capacitor to be charged and discharged in cycles, wherein the capacitor charger system comprises a resonant power converter for connection to said capacitor via an output rectifier, said resonant power converter comprises a switch-based bridge network, an internal transformer, a resonant circuit, and an amplitude stabilization circuit, said switch-based bridge network comprises at least one pair of controlled switches, said resonant circuit includes a series-resonant branch comprising at least one capacitive component and at least one inductive component, and said resonant circuit is connected in the circuit path to a midpoint between a pair of controlled switches of the switch-based bridge network, and the capacitive part of said resonant circuit is connected in a series path with a primary winding of said internal transformer, said amplitude stabilization circuit is configured to provide stabilization of a resonant amplitude of the resonant circuit, and said amplitude stabilization circuit includes one-way conducting circuitry connected between:

i) an unrestricted node defined by a junction anywhere in the circuit path from a capacitive component to an inductive component of the series-resonant branch, and ii) at least one connection point of said resonant power converter having a predefined voltage level at operation, to thereby stabilize the resonant amplitude to vary within predefined limits; and said resonant power converter is configured for connection to said output rectifier via the secondary winding of said internal transformer.

2. The capacitor charger system of claim 1, wherein said one-way conducting circuitry includes a diode connected from said junction to a connection point having a predefined voltage level at operation.

3. The capacitor charger system of claim 2, wherein said diode is connected from said junction to a connection point being represented by a power rail of the resonant power converter.

4. The capacitor charger system of claim 3, wherein said diode is connected from said junction to a DC power rail of the resonant power converter.

5. The capacitor charger system of claim 1, wherein said one-way conducting circuitry includes a first diode connected from said junction to a first connection point having a first predefined voltage level at operation, and a second diode connected from said junction to a second connection point having a second predefined voltage level at operation.

6. The capacitor charger system of claim 5, wherein each diode is connected from said junction to a respective connection point being represented by a respective one of the power rails of the power converter.

7. The capacitor charger system of claim 6, wherein each diode is connected from said junction to a respective one of the DC power rails of the power converter.

8. The capacitor charger system of claim 5, wherein the first connection point has a positive voltage level at operation and the second connection point has a negative voltage level at operation.

9. The capacitor charger system of claim 1, wherein the inductive part of said resonant circuit is integrated with the primary winding of said internal transformer.

10. The capacitor charger system of claim 1, wherein the capacitor to be charged is at least partially discharged and the capacitor charger system is called on to recharge the capacitor, and said amplitude stabilization circuit is configured to step in at the beginning of the recharge process to prevent a run-away condition.

11. The capacitor charger system of claim 1, wherein said resonant power converter is configured to operate based on a switching frequency that lies within 5-10% of a resonant frequency of the resonant circuit.

12. The capacitor charger system of claim 11, wherein said resonant power converter is configured to operate based on a switching frequency that lies within 3% of the resonant frequency of the resonant circuit.

13. The capacitor charger system of claim 12, wherein said resonant power converter is configured to operate based on a switching frequency that lies within 1% of the resonant frequency of the resonant circuit.

14. The capacitor charger system of claim 11, wherein said resonant power converter is configured to operate based on a switching frequency not closer to the resonant frequency than a given safety margin to avoid any overlap between the cycles of the power converter.

15. The capacitor charger system of claim 1, wherein said resonant circuit includes a series-resonant branch composed of a series-connection of a capacitor and an inductor, and said unrestricted node is defined by a junction between the capacitor and the inductor, a so-called LC-junction of the series-resonant branch.

16. The capacitor charger system of claim 1, wherein said resonant power converter is a resonant half-bridge converter or a resonant full-bridge converter.

17. The capacitor charger system of claim 1, wherein said predefined voltage level is a fixed and stable voltage level.

18. The capacitor charger system of claim 1, wherein a further capacitor is arranged in a series path with the primary winding of the internal transformer and configured to prevent saturation of the transformer due to a DC current build-up.

19. A power modulator comprising a capacitor charger system of claim 1.

20. A resonant power converter comprising:
a switch-based bridge network, wherein said switch-based bridge network comprises at least one pair of controlled switches,
an internal transformer,
a resonant circuit, wherein said resonant circuit includes a series-resonant branch comprising at least one capacitive component and at least one inductive component, and said resonant circuit is connected in the circuit path to a midpoint between a pair of controlled switches of the switch-based bridge network, and the capacitive part of said resonant circuit is connected in a series path with a primary winding of said internal transformer,
an amplitude stabilization circuit, wherein said amplitude stabilization circuit is configured to provide stabilization of a resonant amplitude of the resonant circuit, and said amplitude stabilization circuit includes one-way conducting circuitry connected between:
i) an unrestricted node defined by a junction anywhere in the circuit path from a capacitive component to an inductive component of the series-resonant branch, and
ii) at least one connection point of said resonant power converter having a predefined voltage level at operation,
to thereby stabilize the resonant amplitude to vary within predefined limits.

* * * * *